Figure 1:
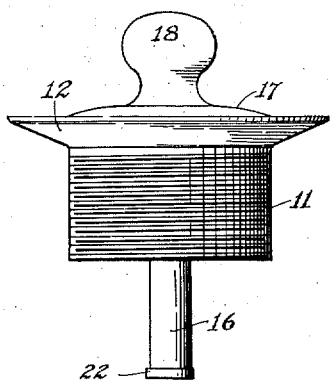

March 13, 1928. Re. 16,902

J. N. MORTIMER

WASTE VALVE FOR BATHTUBS AND LAVATORIES

Original Filed Oct. 18. 1926

Inventor:
John N. Mortimer
By
Attorney.

Reissued Mar. 13, 1928. Re. 16,902

UNITED STATES PATENT OFFICE.

JOHN N. MORTIMER, OF LAKEWOOD, OHIO, ASSIGNOR TO THE CENTRAL BRASS MANUFACTURING COMPANY, OF CLEVELAND, OHIO, A CORPORATION OF OHIO.

WASTE VALVE FOR BATHTUBS AND LAVATORIES.

Original No. 1,630,352, dated May 31, 1927, Serial No. 142,278, filed October 18, 1926. Application for reissue filed December 27, 1927. Serial No. 242,825.

This invention relates generally to a waste valve for bathtubs and lavatories.

The object of the present invention is to provide a waste valve which will take the place of the ordinary chain and stopper in common use and which will completely eliminate the chain, which after a period of use becomes more or less unsanitary.

Another object of the invention is to provide a waste valve which can be quickly and easily opened or closed and which can be retained in open position when desired and another object is to provide a valve which is non-removable and consequently is not likely to be misplaced or stolen. Another and very important object of the invention is to provide for the quick and easy connection of the device to the bathtub without the employment of especially designed tools or technique.

With these various objects in view the invention consists in the details of construction and in the manner of combining or arranging the same, all of which will be fully described hereinafter and set forth in the appended claims.

Figure 2:
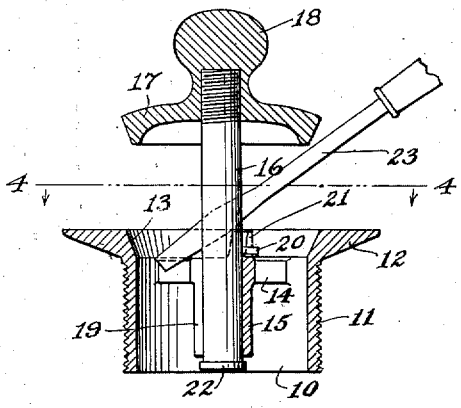
Figure 3:
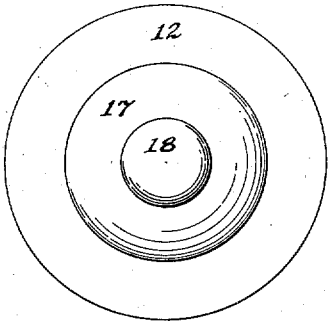
Figure 4:
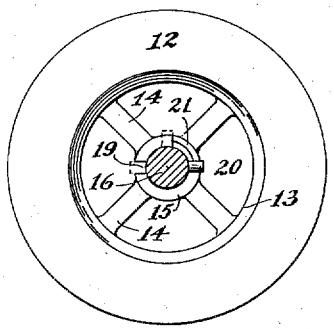

In the drawings forming a part of this specification,

Figure 1 is a side elevation of my improved device ready for insertion into a bathtub or a lavatory, Fig. 2 is a vertical sectional view showing the valve raised or opened, Fig. 3 is a top plan view of the device, and Fig. 4 is a sectional plan on the line 4—4 of Fig. 2 and looking downwardly.

In carrying out my invention I employ a metallic ring 10 externally threaded at 11 and provided with an outwardly extending annular flange 12 at the upper end thereof and a tapering or beveled valve seat 13. This threaded and flanged ring or sleeve is screwed through the bathtub opening from above into the drain elbow thereof and the flange 12 seats within a recess usually provided for the same, so that the top of the sleeve is flush with the bottom of the bathtub.

The sleeve 10 is formed with a spider having radial members 14 and a centrally bored hub 15, and working up and down in this hub is the stem 16 of tapered valve part 17; said valve being sized and shaped to fit snugly upon the beveled seat 13. This valve is also provided with any suitable knob 18 or other device, by means of which it may be manipulated as herein described.

In the drawings the stem 16 is shown threaded into the tapped valve part 17, but it will be understood, of course, that it may be made integral therewith, if so desired. The hub 15 is slotted vertically, as indicated at 19, and the stem 16 is provided with a laterally projecting pin 20 which travels up and down in the slot 19, when the valve is being raised and lowered. In order to maintain the valve in its open position, it may be given a turn in either direction, after the pin 20 has been lifted clear of the hub, which is provided with a stop 21, against which said pin 20 is adapted to contact and limit the turning movement of the valve part. This lug or stop 21 is so positioned that the valve may be turned in either direction to effect the support of the valve in its elevated position. However, this improvement is not necessarily limited to the precise supporting means herein shown and above described.

The stem 16 is provided with a terminal collar 22 to prevent said stem being withdrawn from the hub. This collar may be an integral part of the stem 16 or it may be attached thereto, and it may be either a complete collar or merely a lateral projection, so long as the same is of such size as to prevent withdrawal.

The stem 16 is of such length and the pin 20 is so positioned thereon that when the valve is completely opened, there is ample space between the valve and ring to insert a screw driver 23 or any other suitable tool for the purpose of turning the ring to screw the same into the bathtub or lavatory without injuring in any manner the valve or seat. This eliminates the formation of the ring in any peculiar manner and also eliminates the use of special tools or technique for the placement and securing of the device in the bathtub or lavatory. The valve stem, while being of such length as to elevate the valve sufficiently for the introduction of the screw driver or other tool is not sufficiently long to contact with the bottom of the drain elbow nor will it interfere with the free exit of the water.

In order to close the valve it is only necessary to turn the stem until the pin 20 is in register with the groove 19 and then permit the valve to drop upon its seat. To open the valve it is only necessary to lift the same vertically and give the stem a turn in either direction until the pin 20 contacts with the stop lug or projection 21.

It will thus be seen that I provide an exceedingly cheap, simple and efficient form of waste valve which will effectively carry out all of the objects hereinbefore recited. More particularly, this construction readily lends itself to the ready insertion and removal of the valve structure interiorly of the bathtub from above its drain elbow.

Having thus described my invention, what I claim is:

1. As a new article of manufacture, a waste valve for bathtubs comprising an externally threaded sleeve provided at its upper end with an outwardly extending flange, said sleeve having a valve seat at its upper end, a centrally disposed spider having a longitudinally slotted hub, said hub having an upwardly projecting stop lug, and a valve provided with a stem, said stem having a laterally projecting pin intermediate its ends and a laterally projecting stop at its lower end, the length of said stem being such as to hold the valve elevated a sufficient distance above the spider to permit a tool to be brought into engagement with said spider for the purpose of screwing the sleeve into the bathtub opening.

2. As a new article of manufacture, a waste valve for bathtubs comprising an externally threaded sleeve provided at its upper end with an outwardly extending flange, said sleeve having a beveled valve seat at its upper end, a tapered valve part adapted normally to seat therein and provided with a depending central supporting stem, an elongated hub adapted to accommodate said stem and permit its vertical movement therein, and provided with a radial connection interiorly of the threaded sleeve, the length of said stem being such as to permit the elevation of the valve part a sufficient distance to allow a tool to be brought into engagement with said radial connection and stem for the purpose of screwing the sleeve into the bathtub opening, and means for temporarily maintaining said valve part in its elevated position.

In testimony whereof, I hereunto affix my signature.

JOHN N. MORTIMER.